US008997144B2

(12) United States Patent
Small et al.

(10) Patent No.: US 8,997,144 B2
(45) Date of Patent: *Mar. 31, 2015

(54) TARGETED ONLINE, TELEPHONE AND TELEVISION ADVERTISEMENTS BASED ON CROSS-SERVICE SUBSCRIBER PROFILE

(71) Applicant: AT&T Intellectual Property I, LP, Atlanta, GA (US)

(72) Inventors: David Small, Dublin, CA (US); Canhui Ou, Berkeley, CA (US); Raghvendra Savoor, Walnut Creek, CA (US); Stephen Sposato, Lafayette, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/926,099

(22) Filed: Jun. 25, 2013

(65) Prior Publication Data

US 2014/0157309 A1    Jun. 5, 2014

Related U.S. Application Data

(63) Continuation of application No. 11/894,054, filed on Aug. 17, 2007, now Pat. No. 8,505,046.

(51) Int. Cl.
| | | |
|---|---|---|
| *H04N 7/025* | (2006.01) |
| *H04N 21/435* | (2011.01) |
| *H04H 20/82* | (2008.01) |
| *H04H 60/37* | (2008.01) |
| *H04H 60/46* | (2008.01) |
| *H04H 60/66* | (2008.01) |
| *H04L 12/66* | (2006.01) |
| *H04N 21/258* | (2011.01) |
| *H04N 21/2668* | (2011.01) |
| *H04N 21/466* | (2011.01) |
| *H04N 21/658* | (2011.01) |
| *H04N 21/81* | (2011.01) |

(Continued)

(52) U.S. Cl.
CPC ............. *H04N 21/435* (2013.01); *H04H 20/82* (2013.01); *H04H 60/375* (2013.01); *H04H 60/46* (2013.01); *H04H 60/66* (2013.01); *H04L 12/66* (2013.01); *H04N 21/25891* (2013.01); *H04N 21/2668* (2013.01); *H04N 21/4667* (2013.01); *H04N 21/6582* (2013.01); *H04N 21/812* (2013.01); *H04N 21/6175* (2013.01); *H04N 21/64322* (2013.01)
USPC ......................................................... 725/35

(58) Field of Classification Search
None
See application file for complete search history.

(56) References Cited

U.S. PATENT DOCUMENTS

| | | |
|---|---|---|
| 6,909,837 B1 | 6/2005 | Unger |
| 7,206,754 B1 | 4/2007 | Spector |

(Continued)

FOREIGN PATENT DOCUMENTS

EP    1 339 229 A2    8/2003

*Primary Examiner* — Chenea Smith
(74) *Attorney, Agent, or Firm* — Michael Roebuck, PC

(57) ABSTRACT

A method is disclosed for monitoring data packet traffic in a communication network for at least two of a plurality of subscriber devices associated with a subscriber; developing a holistic subscriber profile for the subscriber based on the monitored data packet traffic; selecting advertisement data for a current one of the plurality of subscriber devices based on the holistic subscriber profile and sending the selected advertising data to the current subscriber device. A system is disclosed for performing the method. A data structure is disclosed for use in performing the method.

20 Claims, 8 Drawing Sheets

(51) Int. Cl.
*H04N 21/61* (2011.01)
*H04N 21/643* (2011.01)

(56) References Cited

U.S. PATENT DOCUMENTS

| | | |
|---|---|---|
| 2001/0047294 A1 | 11/2001 | Rothsehild |
| 2002/0032904 A1 | 3/2002 | Lerner |
| 2002/0069407 A1 | 6/2002 | Fagnani |
| 2002/0087969 A1 | 7/2002 | Brunheroto |
| 2003/0083937 A1 | 5/2003 | Hasegawa |
| 2004/0073915 A1 | 4/2004 | Dureau |
| 2004/0107137 A1 | 6/2004 | Skinner |
| 2004/0117254 A1 | 6/2004 | Nemirofsky |
| 2004/0158528 A1 | 8/2004 | Zuili |
| 2005/0080665 A1 | 4/2005 | Bowman |
| 2005/0278731 A1 | 12/2005 | Cameron et al. |
| 2006/0004632 A1 | 1/2006 | Kelsen |
| 2006/0026629 A1 | 2/2006 | Harris |
| 2006/0080239 A1 | 4/2006 | Hariog |
| 2006/0195866 A1 | 8/2006 | Thukral |
| 2006/0253323 A1 | 11/2006 | Phan |
| 2006/0256133 A1 | 11/2006 | Rosenberg |
| 2007/0074258 A1 | 3/2007 | Wood |
| 2007/0078706 A1 | 4/2007 | Datta |
| 2007/0157228 A1 | 7/2007 | Bayer |

US 8,997,144 B2

TARGETED ONLINE, TELEPHONE AND TELEVISION ADVERTISEMENTS BASED ON CROSS-SERVICE SUBSCRIBER PROFILE

CROSS REFERENCE TO RELATED APPLICATIONS

This patent application is a continuation of and claims priority from U.S. patent application Ser. No. 11/894,054 filed on Aug. 17, 2007 by David Small, entitled Targeted Online, Telephone and Television Advertisements Based on Cross-Service Subscriber Profiling, which is hereby incorporated by reference herein in its entirety.

FIELD OF THE DISCLOSURE

The present disclosure relates to targeted advertising for television commercials and online advertisements.

BACKGROUND OF THE DISCLOSURE

Targeted advertisements have historically been mailed to large targeted geographic areas such as a particular city, so that regional advertisers reach only those advertisement recipients who are deemed by the advertiser as most likely to be responsive to their advertisements. For example, a car dealer in Dallas, Tex. would send advertisements only to residents of Dallas, Tex. and surrounding areas.

Advertisers can potentially save advertising dollars by targeting their advertisements rather than indiscriminately broadcasting their advertisements to a general population of recipients.

DETAILED DESCRIPTION

Figure 1:
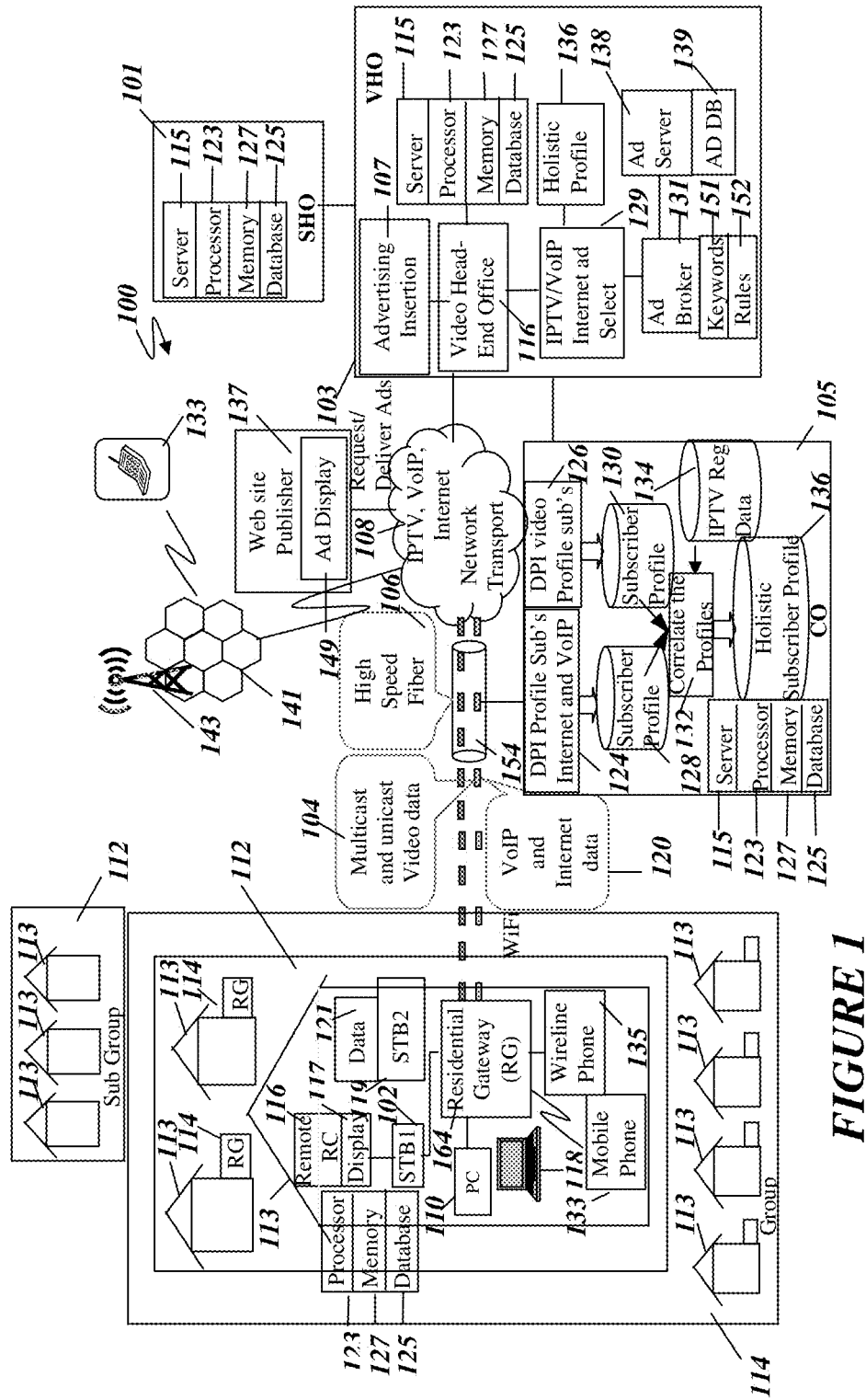
FIG. 1 depicts an illustrative embodiment of a system for sending advertising data and monitoring data sent and received by various subscriber devices associated with a subscriber based on a subscriber's holistic profile.

A particular illustrative embodiment discloses a framework to monitor and correlate subscriber data transferred from subscriber devices across bundled services such as Internet protocol television (IPTV), voice over internet protocol (VoIP) and high-speed Internet. The subscriber data is used to build a holistic subscriber profile. A subscriber's registration data can also be correlated with subscriber data transfers to further refine the holistic subscriber profile. The holistic subscriber profile is indicative of a subscriber's interests in certain products and services that are advertised over the bundled services or VoIP, IPTV and Internet. As a result, the holistic subscriber profile enables the delivery of targeted, personalized advertisements and commercials on an individual service basis (IPTV, VoIP or Internet). Advertisements can be delivered via Internet web page advertisements, mobile cell phone advertisements and/or IPTV advertisements. In another particular embodiment, advertising data is delivered to which ever subscriber device the subscriber is presently using, referred to herein as the "current subscriber device." In another particular embodiment, the advertising data is delivered to a subscriber device other than the current subscriber device. For example, a subscriber's interests as revealed in web surfing, e.g., web sites visited and keywords searched by a subscriber, can be integrated into the holistic subscriber profile and used to provide more targeted IPTV commercials to the subscriber. Likewise a subscriber's interests as revealed in IPTV viewing, e.g., video programs and/or genre of watched frequently or videos ordered on demand, can be integrated into the subscriber's holistic profile and leveraged to provide more targeted online advertisements to be sent to a subscriber.

In another particular illustrative embodiment, a computer readable storage medium is disclosed, having a computer program stored therein, the computer program comprising machine readable instructions that when executed by a computer perform a method for monitoring data packet traffic in a communication network for at least two of a plurality of subscriber devices associated with a subscriber, the method further comprising: developing a holistic subscriber profile for the subscriber, based on the monitored data packet traffic; selecting advertisement data for a current one of the plurality of subscriber devices based on the holistic subscriber profile; and sending the selected advertisement data to the current subscriber device. In another particular illustrative embodiment of the medium, selecting the advertisement is further based on a context for the current subscriber device.

In another particular illustrative embodiment of the medium, the communication network is an Internet protocol television (IPTV) system and the plurality of subscriber devices comprises devices selected from the group consisting of a computer, a web browser, phone, a video receiver set top box and a mobile telephone. In another particular illustrative embodiment of the medium, the current subscriber device comprises a computer and wherein the context further comprises a publisher profile for a website visited by the current subscriber device, the computer program further comprising computer instructions for receiving search criteria from an advertisement broker; detecting a website selection by the subscriber; monitoring according to a deep packet inspection process, data packet traffic associated with the website according to the search criteria; determining from the monitored data packet traffic at least one profile selected from the group consisting of a demographic profile and a psychographic profile associated with the subscriber; and updating the holistic subscriber profile according to the at least one said profiles.

In another particular illustrative embodiment of the medium, current subscriber device comprises a set top box and wherein the context further comprises a video data viewing selection, the computer program further comprising computer instructions for receiving search criteria from an advertisement element; monitoring according to a deep packet inspection process data packet traffic associated with the video set top box; determining from the monitored packet traffic at least one among a demographic profile and a psychographic profile associated with the subscriber; and updating the holistic subscriber profile according to the at least one among said profiles.

In another particular illustrative embodiment of the medium, the current subscriber device comprises a VoIP telephone and wherein the context further comprises telephone usage, the computer program further comprising computer instructions for receiving search criteria from the advertisement element; monitoring according to a deep packet inspection process packet traffic associated VoIP data according to the search criteria; determining from the monitored data packet traffic at least one among a demographic profile and a psychographic profile associated with the subscriber; and updating the holistic subscriber profile according to the at least one among said profiles.

In another particular illustrative embodiment of the medium, the computer program further includes instructions for dividing a plurality of holistic subscriber profiles data for a plurality of subscribers into K advertising groups based on the holistic subscriber profile data for the plurality of subscriber; determining a percentile ranking for end user holistic subscriber profiles among a plurality of holistic subscriber profiles; multicasting J advertising video data multicast groups from a server to a plurality of subscriber devices in J advertising groups having a percentile ranking above or equal to a predetermined percentile ranking; and unicasting from the server, advertising video data channels for actively viewed television channels to a fourth integer, I of end users having a percentile ranking below a predetermined percentile ranking.

In another particular illustrative embodiment of the medium, the advertising video data channels are only unicast and multicast for actively viewed IPTV channels, the method further comprising sending an integer, N IPTV channels to the server. In another particular illustrative embodiment of the medium, the advertising data in the J multicast groups are inserted into one of the N IPTV channels at an subscriber devices in the J advertising groups at the subscriber device and wherein the advertising data in the unicast groups are inserted into one of the N IPTV channels at the subscriber devices in the I advertising groups at an subscriber device. In another particular illustrative embodiment of the medium, the computer program further comprises instructions, IF K is less than a first integer, M, replicating each of N IPTV channels for each of the K advertising groups; inserting into each replicated IPTV channel in each advertising group, advertising data selected for the advertising group; and sending the N times K IPTV channels to an IPTV server close to the subscriber devices.

In another particular illustrative embodiment of the medium, the computer program further comprises computer instructions for receiving a registration request from a publisher element; and determining the publisher profile in response to the registration request. In another particular illustrative embodiment of the medium, the computer program further comprises instructions, IF K is less than a first integer, M, replicating each of N IPTV channels for each of the K advertising group; inserting into each replicated IPTV channel in each advertising group, advertising data selected for the advertising group; and sending the N times K IPTV channels to an IPTV server close to the subscriber device.

In another particular illustrative embodiment a system for sending advertising data is disclosed, the system including but not limited to a processor in data communication with a computer readable medium; in a communication system; a deep packet inspection (DPI) device for analyzing data traffic in the communication system generated by a subscriber on a plurality of subscriber devices; a correlation element for correlating the data into a holistic subscriber profile; and an advertising broker element for selecting advertising data based on the holistic subscriber profile to send to a current subscriber device. In another particular illustrative embodiment of the system, the communication system is an Internet protocol television (IPTV) system and the current subscriber device is selected from the group consisting of a personal computer, a web browser, a mobile telephone and a set top box, the system further comprising a context element for use by the advertising broker in selecting the advertising data.

In another particular illustrative embodiment of the system, the context is selected from the group consisting of a website visited by a computer, telephone usage data and video data viewed. In another particular illustrative embodiment of the system, the system further comprises a computer program embedded in the memory, the computer program further comprising instructions to divide a plurality of subscriber devices into K advertising groups based on holistic subscriber profile data for the plurality of subscriber devices; instructions to, IF K is greater than or equal to M, send N IP channels to an IPTV server that sends data to the subscriber devices; instructions to determine a percentile ranking for holistic subscriber device profiles among a plurality of holistic subscriber device profiles; instructions to multicast J advertising data multicast groups to subscriber devices in J advertising groups having a percentile ranking above or equal to a predetermined percentile ranking; and instructions to unicast advertising video data channels for active IP channels being viewed to a fourth integer, I end users having a percentile ranking below a predetermined percentile ranking.

In another particular illustrative embodiment of the system, the predetermined percentile ranking, I, J, and M are selected based on IPTV system available bandwidth between the IPTV server and the subscriber devices. In another particular illustrative embodiment of the system, the predetermined percentile ranking is substantially 80%. In another particular illustrative embodiment of the system, the computer program further comprises instructions to send channel assignment data to the subscriber devices indicating internet protocol addresses for IPTV channels and advertising data for the IPTV channels. In another particular illustrative embodiment of the system, the advertising data in the J multicast groups are inserted into one of the N IPTV channels at a subscriber device in the J advertising groups at the and wherein the advertising data in the unicast groups are inserted into one of the N IPTV channels at the subscriber devices in the I advertising groups.

In another particular illustrative embodiment a data structure embedded in a computer readable medium is disclosed, the data structure comprising: a first field for containing data indicative of a holistic subscriber profile for a subscriber based on inspecting data transfers for a plurality of subscriber devices associated with the subscriber; and a second field for containing data indicative of a current subscriber device selected from a plurality of subscriber devices for receiving the advertisement selected based on the holistic subscriber profile. In another particular illustrative embodiment of the data structure, the data structure further comprises a third field for containing data indicative of a context for the current subscriber device for selecting the advertisement, wherein the context is one of the group consisting of a web site profile for a web site visited by a computer current subscriber device, telephone usage for a telephone current subscriber device and video data viewing selection for a STB current subscriber device.

In another particular illustrative embodiment, subscriber interests are derived from IPTV, Internet and VoIP data monitored via deep packet inspection. IPTV data includes but is not limited to, programs that are watched frequently and videos ordered on demand. VoIP data can include telephone numbers, names and characteristics (sports, movies, clothes) of merchants called by a subscriber to determine the subscriber's interests in particular products and services. A subscriber's telephone usage such as conference calling and frequency of telephone usage, domestic and international calling can be tracked and integrated into the holistic subscriber profile.

In another illustrative embodiment, an online contextual pay-per-click model can be broken down into search engine based and publisher based profiling. There are four entities in the value chain of online advertising: advertisers, advertisement brokers, publishers, and Internet users. Advertisers are those companies whom advertise their products and services online. Advertisers distribute their advertisements via advertisement brokers. In another illustrative embodiment an advertisement broker serves as intermediary to facilitate advertisers distributing advertisements to either targeted website publishers or targeted end users. Publishers can be web sites on the Internet based World Wide Web, which attract end user visits, or hits. A well known example of a publisher web site is the GOOGLE™ web site.

In another particular illustrative embodiment, a search-engine based pay-per-click model derives subscriber interests from deep packet inspection (DPI) of subscriber data traffic for search queries, identifying keywords therein. Publisher profiling derives subscriber interests from the content of a publisher website. The contextual pay-per-click online advertising is based on publisher profiling which includes subscriber profiling by leveraging a broadband provider's visibility into subscriber data and associated activity over, the high speed fiber optical communication lines provided by the IPTV network. Subscriber profiling is defined as the capability to derive a subscriber's current interests by correlating past IPTV, VoIP and Internet data transactions and activities as manifest in the data analyzed and inspected on the IPTV network using DPI.

IPTV providers can collect data from set-top boxes (STBs) and video servers from which subscriber related data statistics are developed that may include for example, but are not limited to, IPTV packages ordered IPTV channels watched and timestamps; IPTV programs watched and timestamps; IPTV programs recorded and IPTV videos ordered via on demand. Broadband providers (such as an IPTV provider) can leverage technologies such as DPI to look into subscriber Internet, VoIP and IPTV traffic. DPI devices can inspect packet headers, data packet payloads as well as multiple data packets and interpret the data packets according to protocols such as hyper text transfer protocol (http) and domain name service (DNS). With DPI devices, broadband providers can profile subscribers by tracking subscriber behavior and interests from data such as websites visited and timestamps; search queries and advertisements clicked.

A holistic subscriber profile can be built by correlating these subscriber packet data and other information from subscriber registration with the IPTV profile and the high speed internet data profile for a particular end user or end user household. The profiles based on IPTV viewing history, VoIP data and Internet data traffic for the same subscriber can then be correlated with IPTV subscriber registration information data and subscriber geographic location to build a holistic subscriber profile. In another particular embodiment, if desired and allowed by the subscriber, VoIP traffic data packets can be inspected using DPI data in the IPTV network and correlated with the Internet traffic and IPTV data to form the holistic subscriber profile. The holistic subscriber profile so generated includes much more information than what is available from a single source, e.g., either Internet traffic data or IPTV traffic data alone. As a result, the holistic subscriber profile enables online advertisements, portable phone advertisements, and TV commercials to be targeted to the subscriber's specific interests. More targeted online advertisements lead to higher click-through rates and more advertisement revenue. More targeted TV commercials lead to more effective commercials and more advertisement revenue.

In another particular illustrative embodiment, contextual pay-per-click online advertising is provided based on website publisher profiling with DPI in combination with the holistic subscriber profile. In another particular illustrative embodiment, the following scenario is performed. A publisher, e.g., exoticpets.com in this example, registers with an advertisement broker, which can also be the broadband provider or IPTV provider. In a particular illustrative embodiment, the broadband provider is an IPTV provider, providing subscribers with IPTV, high speed Internet data connectivity and VoIP over an IPTV network. In this case the IPTV network can be referred to as a triple play network, indicating that the IPTV network provides three services, including but not limited to IPTV, VoIP and Internet. These services are offered together and are referred to as bundled services. An advertisement broker (AB) profiles the publisher websites through registration information provided by a web site publisher and by characterizing subscribers who visit a particular web site and along with profiling content for the web site subscriber. For example, SPORTSWEBSITE.COM™ could be characterized as a sports web site and visitors to the web site would be characterized as male sports fans ages 18-35. Thus, when subscriber "sports fans" as deemed by a prior visit to SPORTSWEBSITE.COM™ visits a second web site, the second web site can be characterized as a sports related web site or as a site that attracts 18-35 year old males. The content of the publisher website is also taken into consideration when profiling the website and the publisher.

In another particular embodiment, a broadband service subscriber (IPTV subscriber) accesses the Internet and visits the publisher's web site on the World Wide Web. The data for a subscriber's current visit and earlier visits are inspected and profiled by a DPI device in the IPTV network and used to create a holistic subscriber profile that is then stored in a database. In a particular illustrative embodiment, the holistic subscriber profile is stored in a data base and is accessible throughout the IPTV network. In another particular illustrative embodiment, the data base is a subscriber database, In another particular illustrative embodiment, a web site publisher, such as SPORTSWEBSITE.COM™ generates a response page from the publisher via the IPTV system, which contains an embedded interface code, which can be JavaScript, from the advertisement broker. The interface code requests advertisements from the advertisement broker with some parameters customized for this publisher profile. The advertisement broker accesses the holistic subscriber profile. The broadband provider returns the holistic subscriber profile to the advertisement broker. The advertisement broker delivers advertising data in real time based on the publisher's profile and the holistic subscriber profile. The subscriber receives the response page, which includes content data from the publisher and advertisements from the advertisement broker. The advertisement broker response is also inspected and profiled by the DPI device. In a particular illustrative embodiment the advertisement broker is part of and provided by an IPTV triple play network.

The holistic subscriber profile is generated from data inspected by the DPI device. Advertisements on the publisher's site to be targeted to the subscriber's specific interests, based on the holistic subscriber profile which in turn leads to higher click-through rate and more advertisement revenue. In a particular illustrative embodiment, a DPI device in the IPTV network profiles a subscriber. The broadband provider DPI device extracts keywords and rules from the advertisement broker. Sample keywords may include car, BMW, GM, Ford, flower. The advertisement broker can associate one keyword to a list of advertisements. Rules may include "if the subscriber visited any car related website, then look for the following keywords in this subscriber's packets." When a subscriber visits a publisher the DPI device inspects the subscriber data for the current visit and earlier visits based on the keywords and rules and correlates to the subscriber's current holistic profile.

The DPI device updates the subscriber's holistic subscriber profile. The subscriber's request reaches the publisher. The publisher generates the response page, which embeds some interface code, typically JavaScript, from the advertisement broker. The interface code requests advertisements from the advertisement broker with some parameters selected for the visited publisher's publisher profile. The advertisement broker requests the holistic subscriber profile, from the broadband provider. The broadband provider provides the holistic subscriber profile to the advertisement broker. The advertisement broker delivers in real time advertisements based on the publisher's profile and the holistic subscriber profile. A subscriber's personal computer (PC) receives the website response page, which includes the content from the publisher and advertisements from the advertisement broker. The response is also inspected and profiled by the DPI device in the IPTV network and integrated into the holistic subscriber profile.

A broadband provider can either partner with external advertisement brokers or provide their own advertisement broker function. By partnering with advertisement brokers, the broadband provider can leverage the advertisement brokers' advertiser and publisher bases and publisher profiling technology. On the down side, the broadband provider can only receive a share of the advertising revenue from the advertisement brokers. By becoming an advertisement broker, the broadband provider enjoys all the advertising revenues, but also builds a sizeable advertiser and publisher database and to develop publisher profiling technology.

In an illustrative embodiment, targeted advertising is directed to individuals or groups of individuals based on their interests and demographics derived from holistic subscriber profiles for the individuals. The IPTV system collects data from STBs and residential gate way. The IPTV system derives the following subscriber related statistics from the data, including but not limited to channels watched and timestamps, programs watched and timestamps, programs recorded, videos ordered via on demand. Additionally, residential gate way associate ecommerce purchases on the Internet, Internet surfing history, video on demand purchases associated with the IPTV system can be stored in the holistic subscriber profile data. The above subscriber related statistics and subscriber profile data are stored in the holistic subscriber profiles. The holistic subscriber profiles are continuously and dynamically updated in a "self learning mode" in real time so that division of the holistic subscriber profiles into multicast advertising groups and unicast to individual end users based on a percentile ranking is continuous and dynamic in real time. That is, based on changes in the continuously updated holistic subscriber profile data, the division of holistic subscriber profiles into various multicast advertising groups or unicast to individuals, changes dynamically in near real time as subscriber holistic profile data changes are stored in the holistic subscriber profiles. The available IPTV network bandwidth can also change dynamically as IPTV system demand varies, thus, those parameters for dividing the holistic subscriber profiles that change based on available IPTV bandwidth, vary as the available bandwidth varies causing the division of end user holistic subscriber profiles into advertising groups to vary dynamically along with IPTV available bandwidth.

A holistic subscriber profile can be built by correlating such subscriber related statistics and the holistic subscriber profile data along with other information such as gender, age, income, languages spoken, areas of interest, etc. volunteered by a subscriber during an IPTV registration process. The video profile information will contain data for which a subscriber has opted in for monitoring and use by the IPTV system for the purposes of receiving targeted advertising data. Subscriber interests can be inferred based on the holistic subscriber profile data. Based on subscribers' interests and background holistic subscriber profiling results, one of the following targeted advertising data delivery described herein or an equivalent thereof can be utilized to provide personalized advertising data and television commercial delivery to IPTV television displays, portable subscriber data and messaging devices such as mobile or cell phones and website banners and pop up displays on a PC or Laptop.

To allocate IPTV system bandwidth efficiently, in another particular illustrative embodiment most of the subscribers to an IPTV system can be categorized into a few advertising groups, such as sports, home & gardening, business, etc. In another illustrative embodiment most of the IPTV subscribers can be categorized into K advertising groups, where K is a small integer, for example, five or less. In another illustrative embodiment each of N available IPTV channels is replicated into K multicast groups at a main IPTV server, referred to as a super head end (SHO), one replicated channel for each of K advertising groups. In another illustrative embodiment, the channel replication occurs at the SHO. At the SHO, inserted into each channel in each of the K multicast groups is a corresponding unique television commercial targeted to each of the K advertising groups. The SHO broadcasts all the channels to a location such as a regional IPTV server reffered to as a video head end (VHO) or local IPTV server referred to as a central office (CO) server which is close to the IPTV end users or subscribers. When a subscriber wants to view a particular channel, the subscriber enters a channel request to an STB associated with the subscriber. The subscriber's STB then uses channel assignments received from the SHO to map the subscriber channel requests such that the subscriber joins one of the K multicast groups (TV channels) with commercials targeted to the subscriber's profile as indicated by the advertising group to which the subscriber is assigned.

In another illustrative embodiment described above utilizes K times more bandwidth distribution of N IPTV channels. In a second illustrative embodiment, less bandwidth is utilized as all the N IPTV channels are delivered in multicast; however, the slots for commercials are left empty. Moreover, in the present example of another illustrative embodiment, the N IPTV channels are not replicated for each advertising group. Personalized commercials or advertising data for the actively viewed programs are delivered to a subscriber's STB at a reduced speed via unicast. The STB fills in the empty slots inserting the personalized advertising data or commercials with the advertising data received in unicast from the IPTV system. In MPEG, as long as the personalized commercials or advertising data starts with an MPEG I-frame, the personalized commercials will run smoothly with the regular video and television program.

In one particular illustrative embodiment, K is a small integer, less than 5. Given that K, the number of subscriber profiles, is unlikely to be large, since in a particular illustrative embodiment, substantially 80% of all IPTV subscribers can be categorized into top 20% of the subscriber profiles or advertising groups, another particular illustrative embodiment can be enhanced as follows. For each regular IPTV TV channel, there will be corresponding K (K=5 in this example) multicast groups (corresponding to K advertising groups) which are used to deliver personalized television commercials to subscribers. When a subscriber tunes to a particular channel, the STB will join not only the multicast group for the regular IPTV TV channel, but also the multicast group for the targeted commercials personalized or advertising data directed to the subscriber. However, the personalized commercial or advertising data channels are multicast at a reduced speed (relative to a regular IPTV channel multicasts) via K streams, one stream for each advertising groups.

In another particular illustrative embodiment the commercials delivered to a subscriber are based on the subscriber's holistic subscriber profile, and therefore, more personalized.

Turning now to FIG. 1, the IPTV system 100 delivers content and advertising to subscriber house holds 113. Television advertising data is inserted context by the advertising server 138. In the IPTV system, ITPV channels are first broadcast from a super head end (SHO) 101 to a regional or local IPTV VHO server 103, to a central office (CO) server 105. The hierarchical IPTV system 100 includes a hierarchically arranged network of servers wherein the SHO transmits video and advertising data to a video head end (VHO) 103 end server location close to a subscriber, such as a CO server 105. Actively viewed channels are sent in an Internet protocol (IP) data multicast group to the set-top boxes (STBs) at IPTV subscriber homes from the local server (CO). Each SHO, VHO, CO, and STB includes a processor 123, a memory 127 and a database 125. The CO 105 server 115 delivers television content via multicast and television advertising data via unicast or multicast depending on the target television advertising group of end user client subscriber devices to which the advertising data is directed.

In another particular embodiment, subscriber devices, including but not limited to, wire line phone 135, portable phone 133, lap top computer 118, personal computer (PC) 110 and STBs 102, 119 communicate with the IPTV system through residential gateway (RG) 164 and high speed communication lines 106, 154. In another particular embodiment, DPI devices 124, 126 inspect data VoIP, Internet data 120 and video data 104 (multicast and unicast) between the subscriber devices the ITPV system, whether or not the devices are in the household 113 or mobile outside of the household. When outside of the household, subscriber mobile device data is inspected by DPI devices located in IPTV system servers which route the data to a VHO or CO in which the holistic subscriber profile is stored for processing.

As shown in FIG. 1 advertising sub groups 112 (comprising a group of subscriber house holds 113) receive multicast advertising data in video data stream 104 from CO server 115 at a STB 111. Groups 114 are formed as a group of subscriber sub groups 112. Individual households 113 receive unicast advertising data at set top box 111. More than one STB (see STB1 102 and STB2 119) can be located in an individual household 113 and each individual STB can receive a separate unicast advertising stream on IPTV transport 106. In another particular illustrative embodiment separate and unique advertising data are displayed at each set top box (STB) 102, 119 tailored to target the particular subscriber watching television at that particular STB. Each STB 102,119 has an associated remote control (RC) 116 and video display 117. The subscriber via the RC selects channels for a video data viewing selection (video programs, games, movies, video on demand) and places orders for products and services over the IPTV system 100.

FIG. 1 depicts an illustrative television advertising insertion system wherein television advertising data can be inserted at an IPTV server (SHO, VHO, CO) or at the end user client subscriber device, for example, an STB. Advertising data can be inserted into an IPTV video stream via advertising insertion device 107 at the IPTV VHO server 103 or at one of the STBs 102, 109. The IPTV servers include an advertising server 138 and an advertising database 139. The advertising data is selected by advertising selection element 129 from the advertising database 139 based on the holistic subscriber profile and delivered by the VHO advertising server 138 to the IPTV VHO server 115. A super head end (SHO) 101 distributes data to a regional video head end (VHO) 103 which distributes data to local central offices (CO) 105 which distribute data to a service area interface (not shown) to subscriber devices such as STBs 102,119. Advertising data is also selected based on the holistic subscriber profile and sent to a mobile phone or computer associated with the subscriber.

Figure 2:
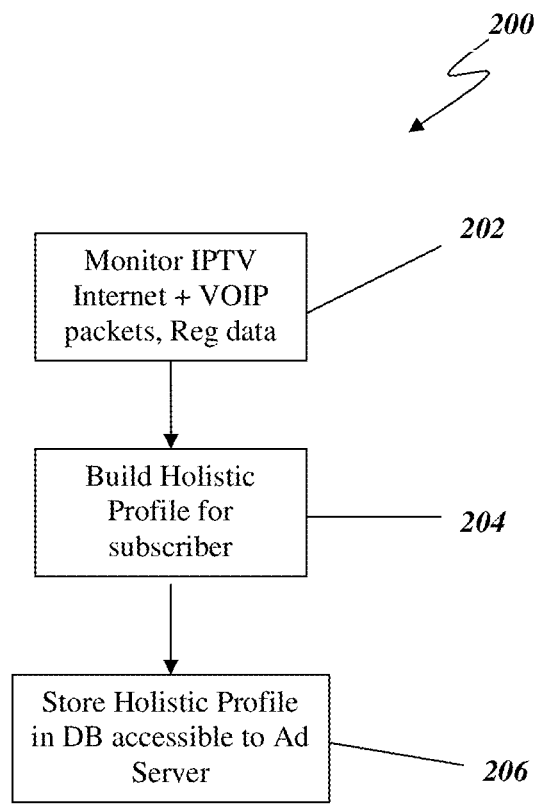
FIG. 2 depicts a flow chart of functions performed in an illustrative embodiment for creating a holistic subscriber profile.

Turning now to FIG. 2, FIG. 2 is a flow chart 200 depicting functions performed in another illustrative embodiment for developing a holistic subscriber profile. In block 202 another illustrative embodiment monitors IPTV, Internet and VoIP packet data and, subscriber registration information 134. In block 204 another particular illustrative embodiment uses the monitored data to build a holistic subscriber profile 136 for a subscriber. In block 206 another store holistic profile data in database (DB) 139 accessible to advertising servers and throughout the IPTV system.

Figure 3:
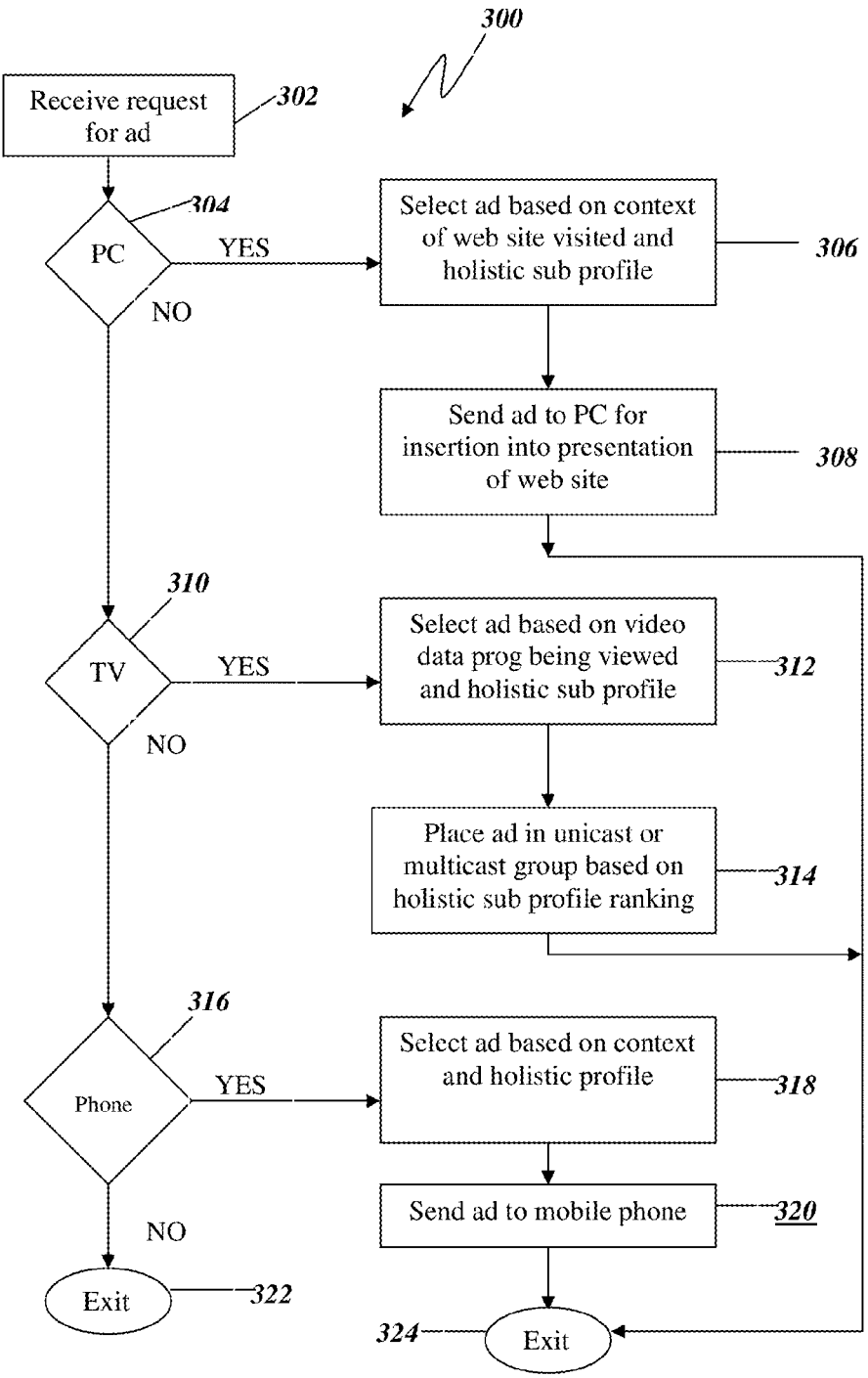
FIG. 3 depicts a flow chart of functions performed in another illustrative embodiment for delivering advertising data to another plurality of subscriber devices associated with a subscriber.

Turning now to FIG. 3, FIG. 3 is a flow chart 300 depicting functions performed in another illustrative embodiment. In block 302 another illustrative embodiment receives a request for an advertisement. If the advertisement data is to be sent to a PC 304 or other similar device such as a mobile lap top or mobile telephone that is visiting a web site, then an advertisement is selected based on context of the web site visited by the PC and the holistic subscriber profile 306. In block 308 an advertisement is sent to the PC for insertion into presentation of web site page. In block 324 the function exits. If at block 304 the request is not in context of a PC then the function proceeds to block 310.

If the advertisement request is for television the advertisement then the function goes to block 312 and selects television advertisement data based on context of the program being viewed and a holistic subscriber profile. In block 314 the advertisement data is placed in a unicast or multicast group based on holistic subscriber profile ranking and the function then exits at block 324. If at block 310 the advertisement request is for a telephone then the function goes to block 318 and selects telephone advertisement data based on telephone context (such as a geographic location, conference call in progress, international call in progress, etc.), and holistic subscriber profile then goes to block 320, sends the advertisement data to the mobile phone and exits at block 324.

Figure 4:
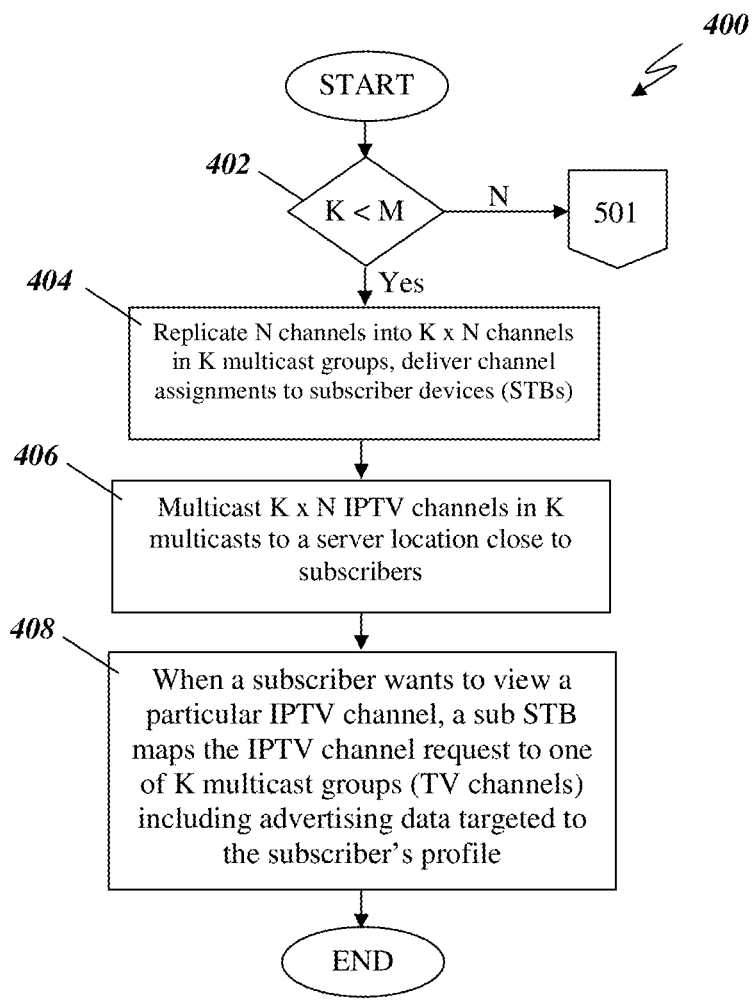
FIG. 4 is flow chart of functions performed in multicasting video and advertising data to a group of subscribers in a particular illustrative embodiment.

Turning now to FIG. 4, FIG. 4 is a flow chart depicting functions performed in an illustrative embodiment where subscribers' house holds containing television or video reception type subscriber devices (e.g., STBs) are categorized into K advertising data groups, based on each holistic subscriber profile. In another particular illustrative embodiment, where K is a small integer (for example, 5 or less) and K is less than M (for example M=6) at block 402, each of the N IPTV channels are replicated in K multicast groups.

Channel assignments consisting of which multicast IP address to join for advertising data associated with a given channel are delivered to each subscriber device member of each K multicast group at block 404. For example, K×N IPTV channels are multicast (N channels in each of K multicast groups) to an IPTV CO server location close to subscriber devices associated with subscribers at block 406. When a subscriber wants to watch a particular IPTV channel, the subscriber enters or requests a channel number at the STB (for example, channel 33 for ESPN) and the STB maps the subscriber channel request (channel 33) to join one of K×N multicast groups (TV channels) with commercials targeted to the subscriber's profile at block 408.

If there are five multicast groups (K=5), that is, there are five advertising groups and there are 100 channels, then the 100 channels are replicated five times, and 5×100 or 500 channels are multicast to the CO from the SHO. Each of the 100 channels is replicated as the SHO in each of the five multicast groups. Thus, when K=5 and N=100, a total of 500 channels are multicast from the IPTV server, for example, the SHO. Separate and distinct advertising data can be inserted into each of the N IPTV channels in each of the K multicast groups so that advertising data is targeted to the advertising group associated with the multicast group. Separate IPTV channel assignments are sent to each advertising group or multicast group. Thus, each STB or subscriber device will receive a channel assignment directing the STB to join a particular multicast group for their multicast group.

If there are 5 advertising groups (K=5) and 5 associated multicast groups, then each subscriber device associated with a member of a particular multicast group is sent a channel assignment for each of the 100 channels. For example, if ESPN is channel 33 and usually delivered on a particular multicast group address by the IPTV system, then each of the members of the five advertising groups could be sent a different channel assignment for channel 33 (advertising group 1, channel 33.1, advertising group 2, channel 33.2, advertising group 3, channel 33.3, advertising group 4, channel 33.4, advertising group 5, channel 33.5) and a multicast group address for each of the 5 versions of channel 33. Each of the five versions of channel 33 contains advertising data selected for the interests associated with the advertising group with which the channel version is associated.

Figure 5:
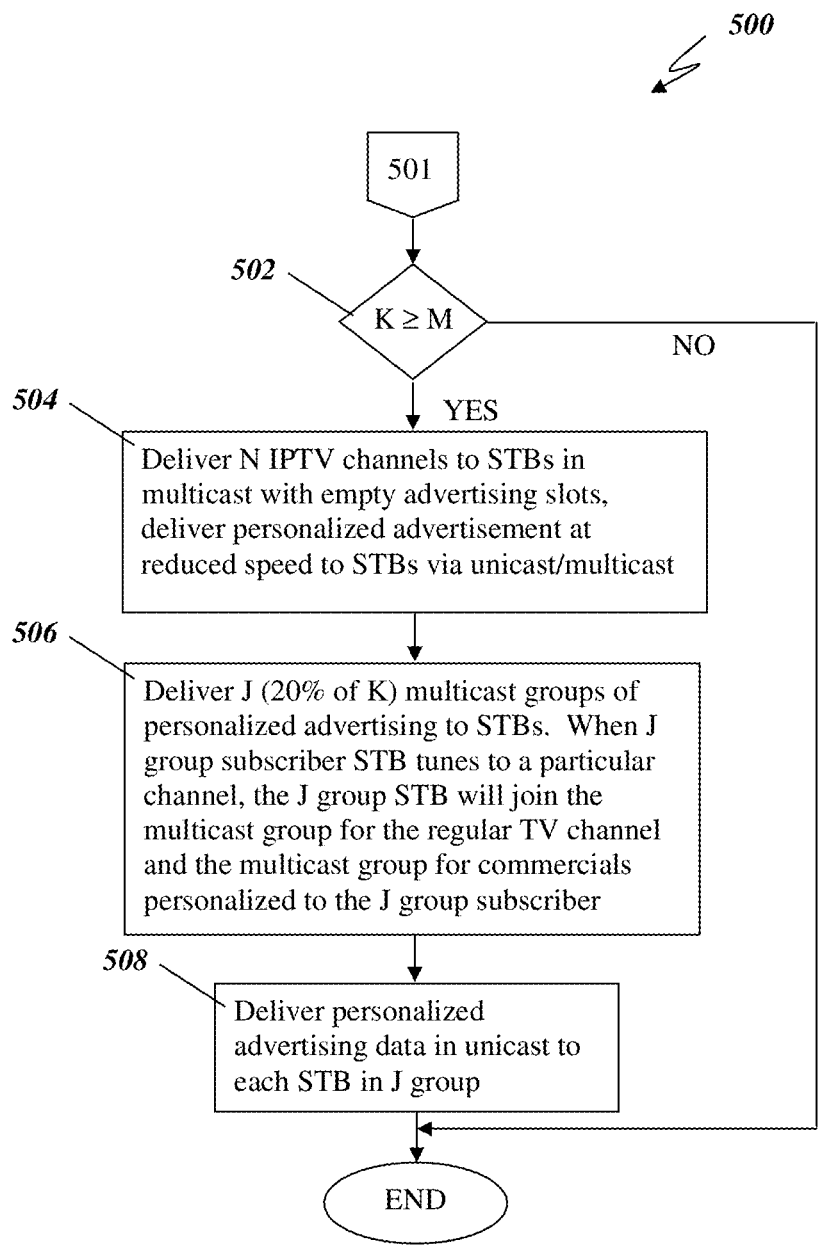
FIG. 5 is a flow chart of functions performed in multicasting and unicasting advertising data to a group of subscribers in another particular illustrative embodiment.

Turning now to FIG. 5, FIG. 5 is a flow chart depicting functions performed in another illustrative embodiment, When K is relatively large, (for example, larger than 6) the number of advertising data groups K M, where M is an integer (for example, 6) selected based on available bandwidth in the IPTV network at block 502, N IPTV channels are delivered to STBs in multicast with empty advertising slots and personalized advertisements are delivered at reduced speed to STBs via unicast/multicast at block 504. It is expected that 80% of subscribers will fit within the top 20% of the K advertising groups. J multicast groups (where J is 20% of K) of personalized advertising are delivered to STBs. When on of the J group subscriber's STB tunes to a particular channel, the J group STB will join a first multicast group for the regular TV channel and a second multicast group for advertising data. The second multicast group contains advertising data delivered at lower speed, containing advertising data personalized to the J group subscriber at block 506. Personalized advertising data is delivered in unicast to each STB in the lower 20% of IPTV subscribers; the I group of subscribers at block 50.

Figure 6:
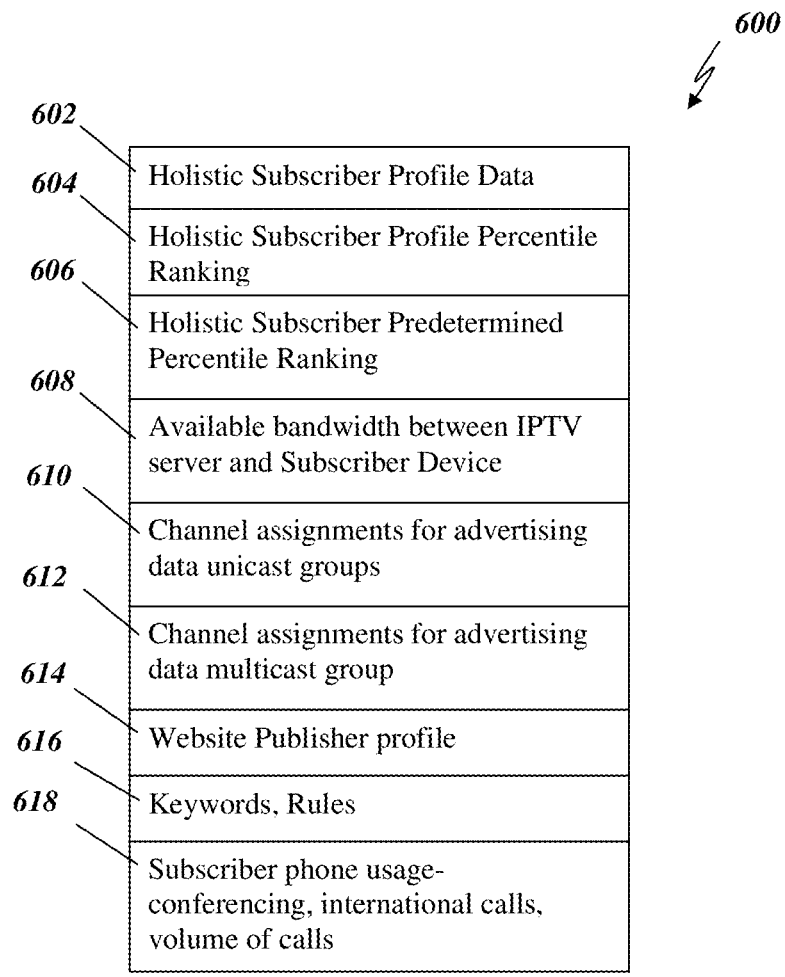
FIG. 6 depicts a data structure embedded in a computer readable medium that is used by a processor and method for delivering advertising data.

Turning now to FIG. 6, in a particular illustrative embodiment a data structure 600 embedded in a computer readable medium is provided. The data structure 600 includes fields for storing data used by an illustrative embodiment of a system and method. In data structure field 602 holistic subscriber profile data field is illustrated for storing data indicative of holistic subscriber profile data. The holistic subscriber profile data includes demographic data such as age, gender, location, income, etc. and interests used by advertisers to select recipients for targeted advertising data based on DPI inspection of IPTV system triple play packet data associated with a subscriber. In data structure field 604, a holistic subscriber profile percentile ranking field is illustrated for storing data indicative of holistic subscriber profile percentile ranking data.

In data structure field 606 a holistic subscriber profile predetermined percentile ranking field is illustrated for storing data indicative of holistic subscriber profile predetermined percentile ranking data. In an illustrative embodiment, the predetermined percentile ranking of 80% was used as an example percentile ranking, however, the predetermined percentile ranking can be adjusted based on the total number of advertising groups (K) and the available bandwidth in the IPTV system. In data structure field 608 the available bandwidth between an IPTV CO server and subscriber device field is illustrated for storing data indicative of IPTV system bandwidth available between IPTV server and subscriber device such as an STB 102 in household 113.

In data structure field 610 channel assignments for advertising data unicast groups field is illustrated for storing data indicative of channel assignments for advertising data unicast group data. In data structure field 612 channel assignments for advertising data in multicast group field is illustrated for storing data indicative of channel assignments for advertising data in multicast group data. In data structure field 614 a website publisher profile field is provided illustrated for storing data indicative of a website publisher profile. In data structure field 616 a keywords and rules, field is illustrated for storing data indicative of keywords and rules. In data structure field 618 a subscriber phone usage-conferencing, international calls, volume of calls field is illustrated for storing data indicative of the subscriber phone usage-conferencing, international calls, volume of calls.

In another illustrative embodiment the broadband, e.g., IPTV provider extracts keywords 151 and rules 152 from the advertising broker 131. Sample keywords may include, e.g., car, BMW, GM, Ford, flower. The advertising broker 131 can associate one keyword to a list of advertisements. Rules may include "if the user visited any car related website, then look for the following keywords in this subscriber's data packets." A subscriber visits the publisher. The DPI element or DPI devices 124, 126 inspect the subscriber's visit data and early visits data based on the keywords and rules and correlates the data to the subscriber's current holistic subscriber profile. The correlation element 132 further correlates subscriber profiles 128 and 130 in to the holistic subscriber profile. The DPI device and correlation element 132 updates the holistic subscriber user's profile. The user request reaches the publisher. The publisher generates the response page, which embeds some interface code, typically JavaScript, from the advertisement broker. The interface code requests advertisements from the advertisement broker with some parameters customized for this publisher. The advertisement broker requests the holistic subscriber profile, from the broadband provider. The broadband provider returns the user profile to the advertisement broker. The advertisement broker delivers in real time advertisements based on the publisher's profile and the holistic subscriber profile. The user gets the response page, which includes the content from the publisher and advertisements from the advertisement broker. The response is also inspected and profiled by the DPI device 124 and correlation element 132.

Advertisements displayed to a subscriber are selected based on the publisher's profile and the. Advertisers only pay for the clicks (or number of times an advertisement was clicked by users), not the impressions (or number of times an advertisement was displayed). The advertisements are based on the publisher's profile and the holistic subscriber profile, thus the users actively visiting the publisher's website are more likely to click them. Advertisers can track the performance of their advertisements. For wireless communications, a wireless application protocol (WAP) or cellular network 141, 143 can represent a plurality of wireless base stations operating according to frequency reuse architecture that provides over-the-air coverage to a large geographic region of mobile messaging devices such as lap top 118 and mobile phone 133.

Some of the messaging devices such as mobile phone 133 can operate as multimode devices. Accordingly, said mobile devices can utilize POTS or VoIP services when in the household 113, or cellular services outside the household 113. A cellular network 141,143 can utilize circuit-switched technology for video and data services such as GSM-GPRS, CDMA-1X, EV/DO, UMTS, and other known and next generation cellular communications technologies. Alternatively, or in combination, other wireless access technologies can be applied to the present disclosure such as Worldwide Interoperability for Microwave Access (WiMAX), ultra wide band (UWB), Bluetooth™, and software defined radio (SDR). SDR provides a means to access public and private communication spectrum with any number of communication protocols that can be dynamically downloaded over-the-air to the messaging devices such as mobile phone 133. Other present and future generation wireless access technologies can also be applied to the present disclosure.

The communication system 100 can further comprise DPI inspection elements 124, 126 a publisher profile element 137, and an advertisement element broker 131. The DPI inspection elements 124, 126 can represent hardware and/or software managed by for example an IPTV system that monitors data packet traffic associated with subscriber devices. The publisher element 137 can represent a web server operated by a publisher that publishes content and advertisements by way of a website accessible to Internet users. The advertisement broker 131 can represent hardware and/or software operated by an advertisement broker for supplying to the publisher element 137 advertisement data which can be selected according to behavioral and/or content profiles derived from the inspection and publisher elements 137 as will be described shortly. Once advertisements have been selected and forwarded to the publisher element 137, the publisher element 137 presents a web page with the advertising data (provided by the advertisement broker) inserted in advertising display space 149 to end users with the publisher's content and targeted advertisements provided by the advertisement broker. Advertisements can represent objects presented singly or combination as audible, still or moving images. It would be appreciated by one of ordinary skill in the art that the DPI inspection, publisher, and advertisement broker can operate singly or in any combination.

Figure 7:
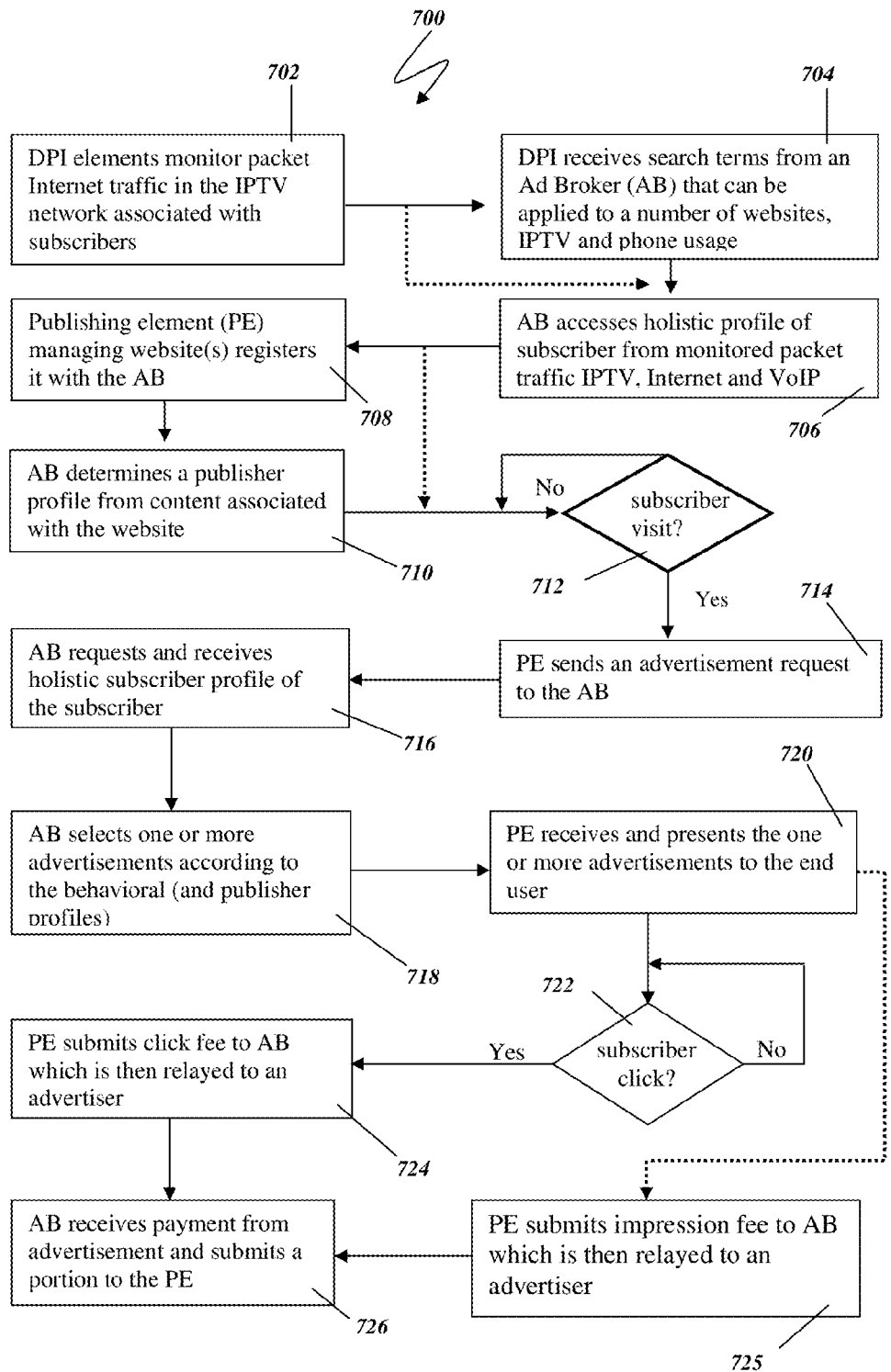
FIG. 7 is a flow chart of functions performed in monitoring data and selecting advertisements in another particular illustrative embodiment.

FIG. 7 depicts an exemplary method 700 operating in portions of the communication system 100. Method 700 begins with step 702 in which the DPI inspection elements 124, 126 monitors packet traffic in the communication system 100 for an end user (subscriber). The DPI inspection elements 124, 126 can utilize inspection technology such as deep packet inspection (DPI) which can analyze packet traffic from any layer in an Open Systems Interconnection (OSI) model such as packet headers and payloads to assess the behavior of a target end user utilizing common market analysis tools. Alternatively, DPI can be applied to a Transmission Control Protocol/Internet Protocol (TCP/IP) applied to the packet traffic. Thus for each of its subscribers, the IPTV system can perform various levels of DPI analysis to determine a demographic and/or psychographic profiles on the product and service interests of its subscriber base. With this information, the DPI inspection elements 124, 126 can generate in step 706 a holistic subscriber profile for each subscriber of the IPTV system or communication system.

In another particular illustrative embodiment, the DPI inspection elements 124, 126 can receive in step 704 from the advertisement broker 138, search criteria that can be applied to a number of websites VoIP data or IPTV data. The search criteria can include a number of search terms (e.g., for cars, boats, clothing, accessories, computers, electronics, office supplies, home supplies, travel, etc.) which can be accompanied with advertisement broker provided search guidelines (e.g., if the end user visits a website related to cars, inspect the following keywords in the user's packets). Thus steps 702-704 can be combined as another means to perform market analysis on data packet traffic and thereby generate a holistic subscriber profile in step 706 for each end user of the ISP.

In another particular illustrative embodiment, the DPI inspection elements 124, 126 can receive from the advertisement broker 138, search criteria that can be applied to a number of websites IPTV data, IPTV data or phone data. The search criteria can include a number of search terms (e.g., for cars, boats, clothing, accessories, computers electronics, office supplies, home supplies, travel, etc.) which can be accompanied with search rules on guidelines (e.g., if the end user is a website related to cars, inspect the following keywords in the user's packets). Thus steps 702-704 can be combined as another means to perform market analysis on data packet traffic and thereby generate a holistic subscriber profile for each subscriber of the IPTV system.

In step 708 the publisher element 137 can register one or more websites managed thereby with the advertisement element broker. In this step, the advertisement broker can be programmed to determine a website publisher profile for each website by inspecting the content published thereby and determining from the content marketing patterns that identify advertisements having a high likelihood of targeting end user interests associated with said content. Thus with a publisher profile, and holistic subscriber profiles for targeted end users, the advertisement broker can target subscribers of the ISP more precisely than prior art systems. In another illustrative embodiment, steps 706 and 708 can be reversed in order. That is, the order of determining a publisher profile and a subscriber profile has no effect on the present disclosure. In yet another particular embodiment, the DPI inspection element can proceed from step 706 to step 712 bypassing the need for determining a publisher profile. In this embodiment, the holistic subscriber profile for each end user subscriber would be utilized alone to target ISP subscribers. In another particular embodiment, the publisher element 137 is part of the IPTV system.

With the holistic subscriber profile and publisher profile (if available), the publisher element 137 can be programmed in step 712 to check for end user visits to a website managed thereby. When a subscriber visit is detected, the publisher element 137 proceeds to step 714 where it submits an advertisement request to the advertisement broker. The advertisement request can include a number of operational parameters such as an identity of the subscriber visiting the website (e.g., an IP address associated therewith), a script (e.g., a Java script), and/or physical and software constraints for presenting advertisement at a designated location in a web page of the website visited by the subscriber. The advertisement broker in step 716 requests from the DPI inspection element the holistic subscriber profile of the subscriber visiting the website.

Once it is received, the advertisement broker proceeds to step 718 where it selects one or more advertisements according to the holistic subscriber profile (and the publisher profile if available). In step 720, the publisher element 137 receives and presents the one or more advertisements to the end user. The presentation of advertisements can be audio only, visual only, still or moving images, or combinations thereof. Once the advertisements are presented, the publisher element can be programmed to track end user selections ("clicks") of the advertisements. If no clicks are detected, the publisher element can be programmed to not submit fees for advertisements.

If on the other hand one or more advertisement selections are detected, the publishing element 137 proceeds to step 724 where it submits fee per click to the advertisement broker, which relays said fee to a corresponding advertiser (a pay per click business model). Alternatively, step 724 can be modified so that click fees are accumulated over periodic payment intervals (e.g., month-to-month) and submitted to the advertisement broker and thereafter to the advertisement over the intervals. Upon receiving a payment from the advertiser, the advertisement broker in step 726 keeps a portion of the payment for fulfilling its brokerage services and submits the remainder to the publisher element. In an alternative embodiment, the publisher element can be programmed to proceed from step 720 to step 725 where it submits an impression fee to the advertisement element which relays the fee to the advertiser (a pay per impression business model). Upon receiving payment, the advertisement broker performs revenue sharing as described in step 726.

It would be evident to an artisan with ordinary skill in the art that the aforementioned embodiments can be modified, reduced, or enhanced without departing from the scope and spirit of the claims described below. For example, method 700 can be applied in the context of a subscriber visiting a website from a cell phone or personal digital assistant rather than a computer. The advertisement model described above can be applied as a push rather than a pull business model. For instance, the advertisement broker 131 can proactively submit an advertisement to the subscriber device 116 prior to the end user visiting a website based on its analysis of the holistic subscriber profile supplied by the inspection element. Moreover, the order and timing of steps 702-725 can be modified without substantially changing the essence of the present disclosure.

Figure 8:
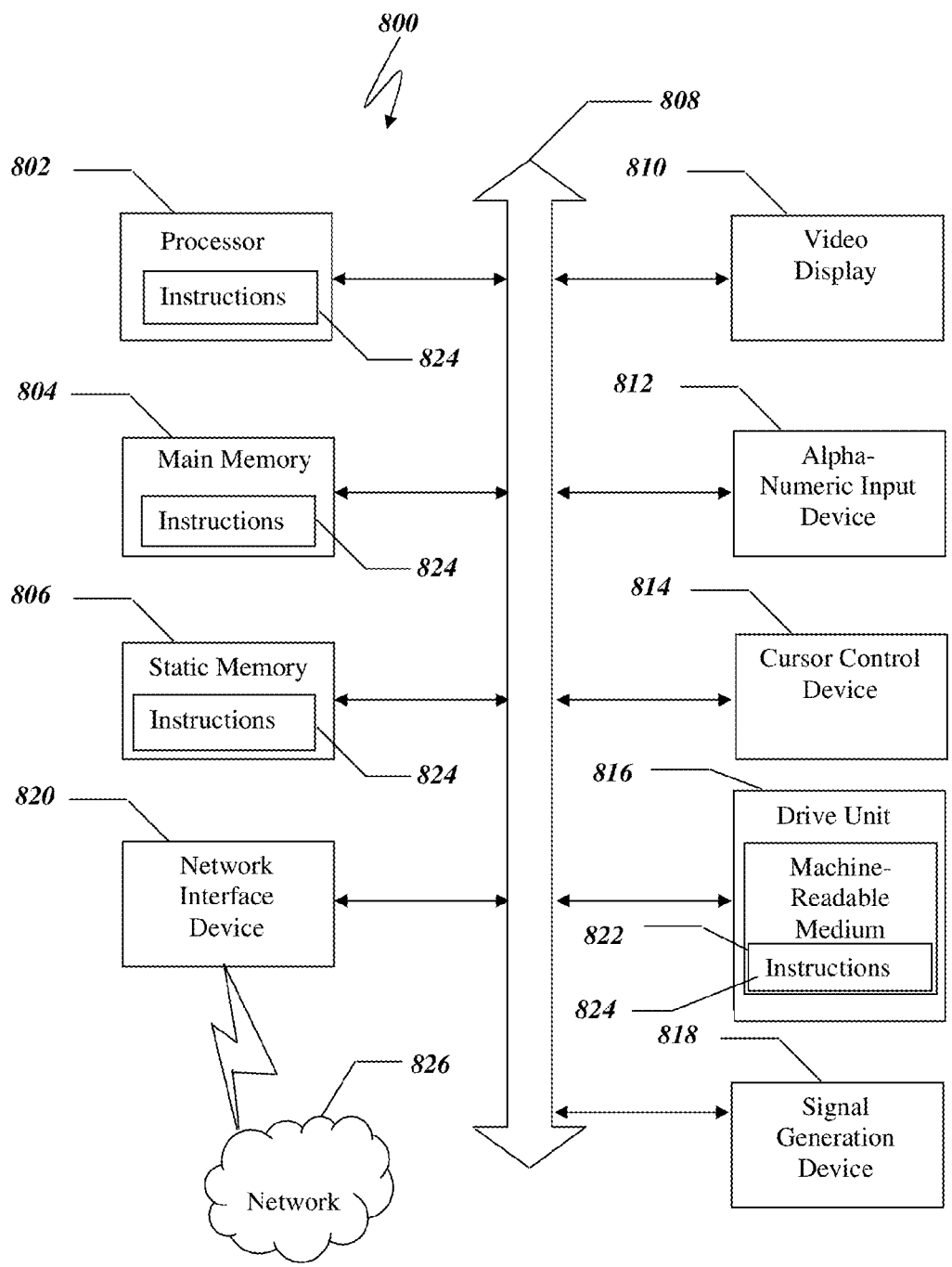
FIG. 8 depicts an illustrative embodiment of a machine for performing functions disclosed in another illustrative embodiment.

FIG. 8 is a diagrammatic representation of a machine in the form of a computer system 800 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU), or both), a main memory 804 and a static memory 806, which communicate with each other via a bus 808. The computer system 800 may further include a video display unit 810 (e.g., liquid crystals display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface.

The disk drive unit 816 may include a machine-readable medium 822 on which is stored one or more sets of instructions (e.g., software 824) embodying any one or more of the methodologies or functions described herein, including those methods illustrated in herein above. The instructions 824 may also reside, completely or at least partially, within the main memory 804, the static memory 806, and/or within the processor 802 during execution thereof by the computer system 800. The main memory 804 and the processor 802 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, in an illustrative embodiment, an example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820. The machine readable medium may also contain a data structure for containing data useful in providing a functional relationship between the data and a machine or computer in an illustrative embodiment of the disclosed system and method.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer readable storage medium, having a computer program stored therein, the computer program comprising:
    instructions to divide a plurality of holistic profiles data for a plurality of subscribers into a quantity, K advertising groups, based on the holistic profiles data for the plurality of subscribers;
    instructions to replicate a quantity, N internet protocol television channels K times;
    instructions to assign a new and unique channel number for each N channel number for each replicated channel in each of the K advertising groups; and
    instructions to map each of the N channel numbers to the new and unique channel number at a set top box when a subscriber selects one of the N channel numbers, wherein each of the N channel numbers is the same in each of the K advertising groups, and wherein each of the N channel numbers is mapped to a different new channel number in each of the K advertising groups.

2. The non-transitory computer readable storage medium of claim 1, the non-transitory computer readable storage medium further comprising:
    instructions to select an advertisement based on a context for the subscriber and wherein the profile for the second web site takes on at least attributes of the holistic profile of the subscriber, the computer program further comprising:
    instructions to create a profile for a second and different web site visited by the subscriber based on the holistic profile of the subscriber developed based on the subscriber visiting the first web site and not based on the subscriber visiting the second web site;
    instructions to select a key word for the second web site based on the profile for the second web site;
    instructions to select advertisement data for a current one of the plurality of subscriber devices based on the key word and the holistic profile for the subscriber; and
    instructions to send the selected advertisement data to the current one of the plurality of subscriber devices.

3. The non-transitory computer readable storage medium of claim 1, wherein the communication network is an internet protocol television network and each of the plurality of subscriber devices is one of a web browser device, a set top box, a mobile phone, and a voice over internet protocol phone.

4. The non-transitory computer readable storage medium of claim 2, wherein the current one of the plurality subscriber devices comprises a computer and wherein the context further comprises a publisher profile for a website visited by the current one of the plurality subscriber devices, the computer program further comprising instructions to:
receive search criteria from an advertisement broker;
detect a website selection by the subscriber;
monitor according to a deep packet inspection process, packet traffic data associated with the website according to the search criteria;
determine from the monitored packet traffic data at least one of a demographic profile and a psychographic profile associated with the subscriber; and
update the holistic profile of the subscriber according to the at least one selected profile.

5. The non-transitory computer readable storage medium of claim 2, wherein the current one of the plurality subscriber devices comprises a set top box and wherein the context further comprises a video data viewing selection, the computer program further comprising instructions for receiving search criteria from an advertisement element; instructions to monitor according to a deep packet inspection process data packet traffic associated with the set top box; instructions to determine from the monitored data packet traffic at least one among a demographic profile and a psychographic profile associated with the subscriber; and instructions to update the holistic profile of the subscriber according to the at least one among said profiles.

6. The non-transitory computer readable storage medium of claim 2, wherein the current one of the plurality subscriber devices comprises a voice over internet protocol telephone and wherein the context further comprises telephone usage, the non-transitory computer readable storage medium further comprising:
instructions to receive search criteria from the advertisement element;
instructions to monitor according to a deep packet inspection process data packet traffic associated with voice over internet protocol data according to the search criteria;
instructions to determine from the monitored data packet traffic at least one of a demographic profile and a psychographic profile associated with the subscriber; and
instructions to update the holistic profile for the subscriber.

7. The non-transitory computer readable storage medium of claim 1, further comprising instructions to determine a percentile ranking for holistic profile data among a plurality of holistic profiles for subscribers, instructions to multicast J advertising video data multicast groups from a server to a plurality of subscriber devices in J advertising groups having a percentile ranking greater than or equal to a predetermined percentile ranking;
and
instructions to unicast from the server, advertising video data channels for actively viewed television channels to a quantity equal to a fourth integer, I of end users having a percentile ranking below a predetermined percentile ranking.

8. The non-transitory computer readable storage medium of claim 7, wherein the advertising video data channels are only unicast and multicast for actively viewed internet protocol television channels, the computer program further comprising instructions to send an integer quantity, N of internet protocol television channels from the server.

9. The non-transitory computer readable storage medium of claim 8, wherein the advertising data in the J multicast groups are inserted into one of the N internet protocol television channels in the J advertising groups at the subscriber device and wherein the advertising data in the unicast groups are inserted into one of the N internet protocol television channels at the subscriber devices in the I advertising groups at the subscriber device.

10. The non-transitory computer readable storage medium of claim 8, the non-transitory computer readable storage medium further comprising instructions to:
determine IF K is less than a first integer, M, then
replicate each of N internet protocol television channels for each of the K advertising groups;
insert into each replicated internet protocol television channel in each advertising group, advertising data selected for the advertising group; and
send the N times K internet protocol television channels to an internet protocol television server closest to the subscriber devices.

11. The non-transitory computer readable storage medium of claim 4, the computer program further comprising instructions to receive a registration request from a publisher element; and instructions to determine a publisher profile in response to the registration request.

12. A computer implemented method for sending advertising data comprising:
dividing a plurality of holistic profiles data for a plurality of subscribers into a quantity, K advertising groups, based on the holistic profiles data for the plurality of subscribers;
replicating a quantity, N internet protocol television channels K times;
assigning a new and unique channel number for each N channel number for each replicated channel in each of the K advertising groups; and
mapping each of the N channel numbers to the new and unique channel number at a set top box when a subscriber selects one of the N channel numbers, wherein each of the N channel numbers is the same in each of the K advertising groups, and wherein each of the N channel numbers is mapped to a different new channel number in each of the K advertising groups.

13. The method of claim 12, wherein the current one of the plurality subscriber devices comprises a computer and wherein the context further comprises a website profile for the second website visited by the current one of the plurality subscriber devices, wherein the website profile for the second web site takes on at least attributes of the holistic profile of the subscriber, the method further comprising a computer program embedded in the computer readable medium, the method further comprising:
creating a profile for a second and different website visited by the subscriber based on the holistic profile of the subscriber developed based on the subscriber visiting the first web site and not the second web site and a context for the subscriber; and
selecting advertising data based on the holistic profile of the subscriber to send to a current one of the plurality subscriber devices;
receiving search criteria from an advertisement broker;
detecting a website selection by the subscriber;
monitoring according to a deep packet inspection process, data packet traffic associated with the first website according to the search criteria;

determining from the monitored data packet traffic at least one profile selected from a demographic profile and a psychographic profile associated with the subscriber; and updating the holistic profile for the subscriber according to one of the demographic profile and the psychographic profile.

14. The method of claim 12, wherein the current one of the plurality subscriber devices comprises a set top box and wherein the context further comprises a video data viewing selection, the system further comprising a computer program embedded in the computer readable medium, the computer program further comprising:

receiving search criteria from an advertisement element;
monitoring according to a deep packet inspection process packet traffic data associated with the set top box;
determining from the monitored packet traffic data at least one among a demographic profile and a psychographic profile associated with the subscriber; and
updating the holistic profile for the subscriber.

15. The method of claim 12, wherein the current one of the plurality subscriber devices comprises a voice over internet protocol telephone and wherein the context further comprises telephone usage, the method further comprising a receive search criteria from the advertisement broker element;

instructions to monitor according to a deep packet inspection process packet traffic associated voice over internet protocol data according to the search criteria;
determining from the monitored packet traffic data at least one a demographic profile and a psychographic profile associated with the subscriber; and
updating the holistic profile for the subscriber.

16. The method of claim 12, further comprising sending N internet protocol channels to an internet protocol television server that sends data to the subscriber devices when K is greater than or equal to M;

determining a percentile ranking for holistic profiles for subscribers from a plurality of holistic profiles for the subscribers;
multicasting J advertising data multicast groups to subscriber devices in J advertising groups having a percentile ranking above or equal to a predetermined percentile ranking; and
unicasting advertising video data channels for active internet protocol channels being viewed to a fourth integer, I end users having a percentile ranking below a predetermined percentile ranking.

17. The method of claim 16, wherein the predetermined percentile ranking, I, J, and M are selected based on IPTV system available bandwidth between the internet protocol television server and the subscriber devices.

18. The method of claim 16, wherein the predetermined percentile ranking is substantially 80%.

19. The method of claim 16, further comprising:

sending channel assignment data to the subscriber devices indicating internet protocol addresses for internet protocol television channels and advertising data for the internet protocol television channels.

20. The method of claim 16, wherein the advertising data in the J multicast groups are inserted into one of the N internet protocol television channels at a subscriber device in the J advertising groups at the and wherein the advertising data in the unicast groups are inserted into one of the N internet protocol television channels at the subscriber devices in the I advertising groups.

* * * * *